United States Patent [19]

Hall

[11] 4,319,560
[45] Mar. 16, 1982

[54] SOLAR HEATING SYSTEM

[76] Inventor: Roy L. Hall, Rte. One, Frankfort, Ky. 40601

[21] Appl. No.: 185,624

[22] Filed: Sep. 9, 1980

[51] Int. Cl.³ .................................................. F24J 3/02
[52] U.S. Cl. .................................... 126/450; 126/429; 126/437; 126/440
[58] Field of Search ................................ 126/435–437, 126/422, 400, 430, 450, 440, 429; 165/104 M, 104 S

[56] References Cited

U.S. PATENT DOCUMENTS

| | | | |
|---|---|---|---|
| 1,753,227 | 4/1930 | Wheeler et al. | 126/437 |
| 3,951,129 | 4/1976 | Brantley, Jr. | 126/448 |
| 3,970,070 | 7/1976 | Meyer et al. | 126/440 |
| 4,110,172 | 8/1978 | Spears, Jr. | 126/450 |
| 4,193,543 | 3/1980 | Viesturs et al. | 126/430 |
| 4,256,090 | 3/1981 | Imperiale | 126/437 |

*Primary Examiner*—James C. Yeung
*Attorney, Agent, or Firm*—Harvey B. Jacobson

[57] ABSTRACT

A solar heating system comprises a heat accumulating structure for heating both air and water in which both the heated air and water are directed to an object to be heated such as a commercial building or private residence. The heat accumulating structure is below ground and includes a magnifying glass forming the roof thereof and protruding above ground, the magnifying glass concentrating the rays of the sun into the heat accumulating structure which includes a lower portion containing water and an air space thereabove. The solar heating system includes a piping arrangement whereby heated water can be directed to the object to be heated and piped away. Likewise a heat trunk line and return air line is included for utilizing the heated air formed in the air space of the heat accumulating structure.

7 Claims, 3 Drawing Figures

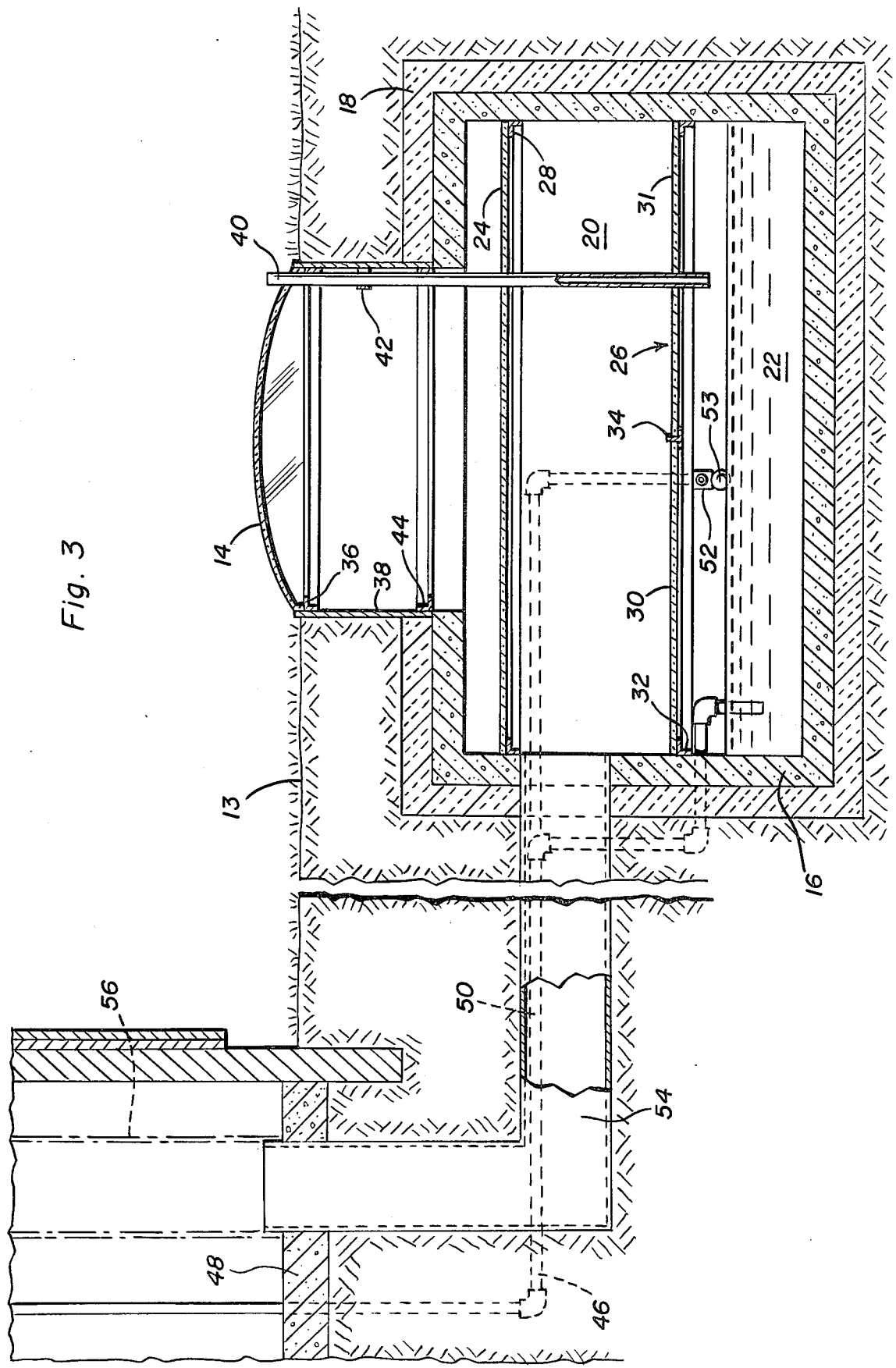

SOLAR HEATING SYSTEM

FIELD OF THE INVENTION

This invention relates to a solar heating system. More particularly, the invention relates to a system for heating both air and water in a heat accumulating structure which is situated below ground level and which is able to store the heated air and water for use when desired.

Recently, there has been great interest in utilizing solar energy as an alternative for finite fossil fuel resources. Many systems have been designed for heating air or water by direct radiation from the sun directed on a single or a plurality of solar collectors placed on the roof of a commercial building or private residence. Many patents have been issued on various configurations of solar collectors. Such solar heating systems have found use in heating air or water for space heating purposes and for hot water usage in general. While recent energy shortages and rising energy costs have brought on the increased interest in solar heating, solar heating systems utilizing industrial age technology have been designed at the beginning of the twentieth century and beyond. An example of such a solar heating system is disclosed in U.S. Pat. No. 965,391, issued July 26, 1910 to Little in which an insulating receptacle is used to hold a mass of heat-absorbing bodies onto which the sun's rays are concentrated by the use of a plurality of lenses. The insulating receptacle includes a cold air inlet in contact with the heated bodies and a heated air outlet in which heated air is directed to a building structure. Other solar heat storage systems are disclosed in U.S. Pat. No. 3,369,541, issued to Thomason, U.S. Pat. No. 4,095,584, issued to Pies, and U.S. Pat. No. 4,119,086, issued to Brussels. Each of these systems require a separate solar heat collecting device in which air or water is heated and directed to the storage chamber. Only the patent to Thomason discloses heating both air and water. U.S. Pat. No. 2,167,576, issued to Kaiser discloses a solar heating system for water while U.S. Pat. No. 4,112,920, issued to Hillman discloses a solar heating system for liquid or air. In each case, the heated water or air can be separately stored. U.S. Pat. Nos. 4,003,363 and 4,003,365 discloses solar heating panels.

The solar heating system of the present invention is able to heat and store both water and air in the same vessel without the need of separate solar heat collectors, thus greatly reducing the cost of such systems.

SUMMARY OF THE INVENTION

Briefly, the solar heating system of the present invention comprises an underground solar heat collecting and storage tank containing an upper air storage compartment and a lower water storage compartment. A solar energy concentrator such as a relatively large magnifying glass is situated above ground to direct and concentrate the rays of the sun into the solar heat storage tank. The solar heat collecting and storage tank is preferably situated adjacent a commercial building or private residence and is used to supply heated air and water thereto, the storage tank including a return for the air and water from the building for reheating of the returned air and water in their respective compartments.

It is an object of the present invention to provide a solar heating system which allows for the simultaneous heating and storing of both air and water.

Another object of the present invention is to provide a solar heating system which is capable of supplying heated air and water to a building structure and which can be built at minimum expense.

Still another object of the present invention is to provide a solar heating system for heating and storing both air and water in a single storage facility and which is able to supply the heated air and water to a building.

Still yet another object of the invention is to provide a solar heating system adjacent a building to provide heated air and water thereto in which a storage tank for heating and storing the heated air and water is below ground.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a sectional view of the solar heating system of the present invention adjacent a building which receives the heated air and water from the heat collection and storage tank taken generally along line 3—3 of FIG. 1.

DETAILED DESCRIPTION OF THE INVENTION

Figure 1:
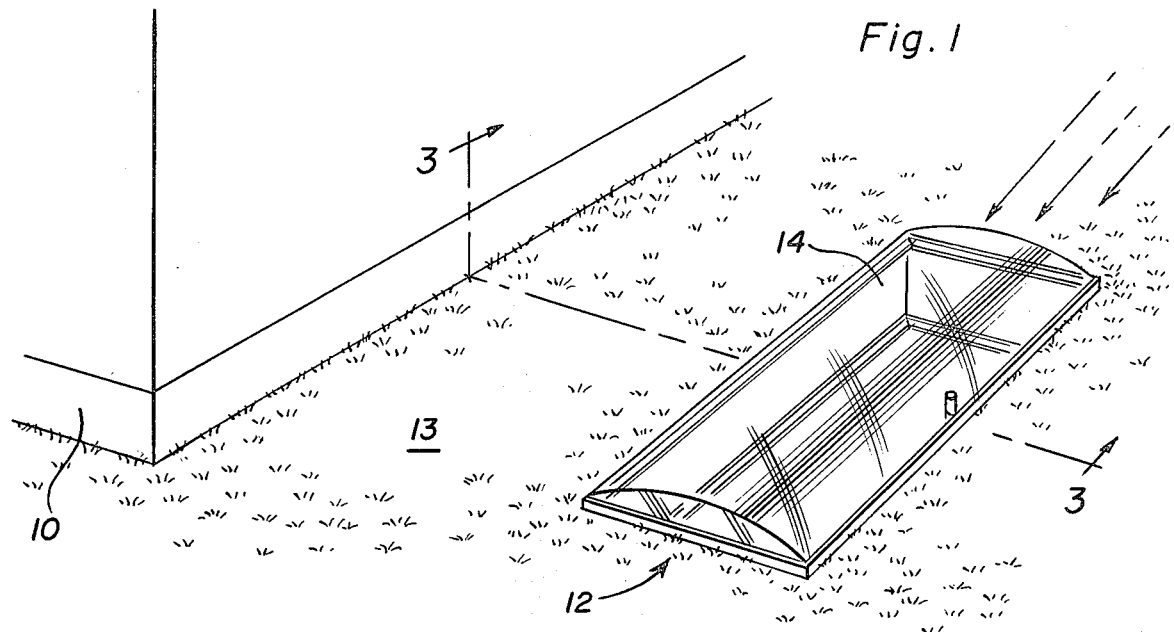
FIG. 1 is a perspective view illustrating the placement of the solar heat system of the present invention adjacent a building in which the solar heating and storage tank is situated below ground and only the solar energy concentrating device is above ground level.

In FIG. 1 is shown building 10 which receives heated air and water from solar heating system 12 of the present invention. As can be seen in FIG. 1, only the solar energy concentrating means such as rectangular magnifying glass 14 is above ground and as close to building 10 as possible to reduce pumping and piping costs. The solar heating system 12 of the present invention does not require an unsightly structure situated above ground or placed on the roof of building 10 which can adversely affect the landscape adjacent building 10, possibly reducing land values and can adversely affect the original architecture and reduce the value of building 10, especially if building 10 is a private residence. Both water and air are heated and stored in the storage tank below ground in which solar radiation impinging upon magnifying glass 14, as indicated by the arrows, is concentrated and directed to the air and water contained in the storage tank below as more fully described below.

Figure 2:
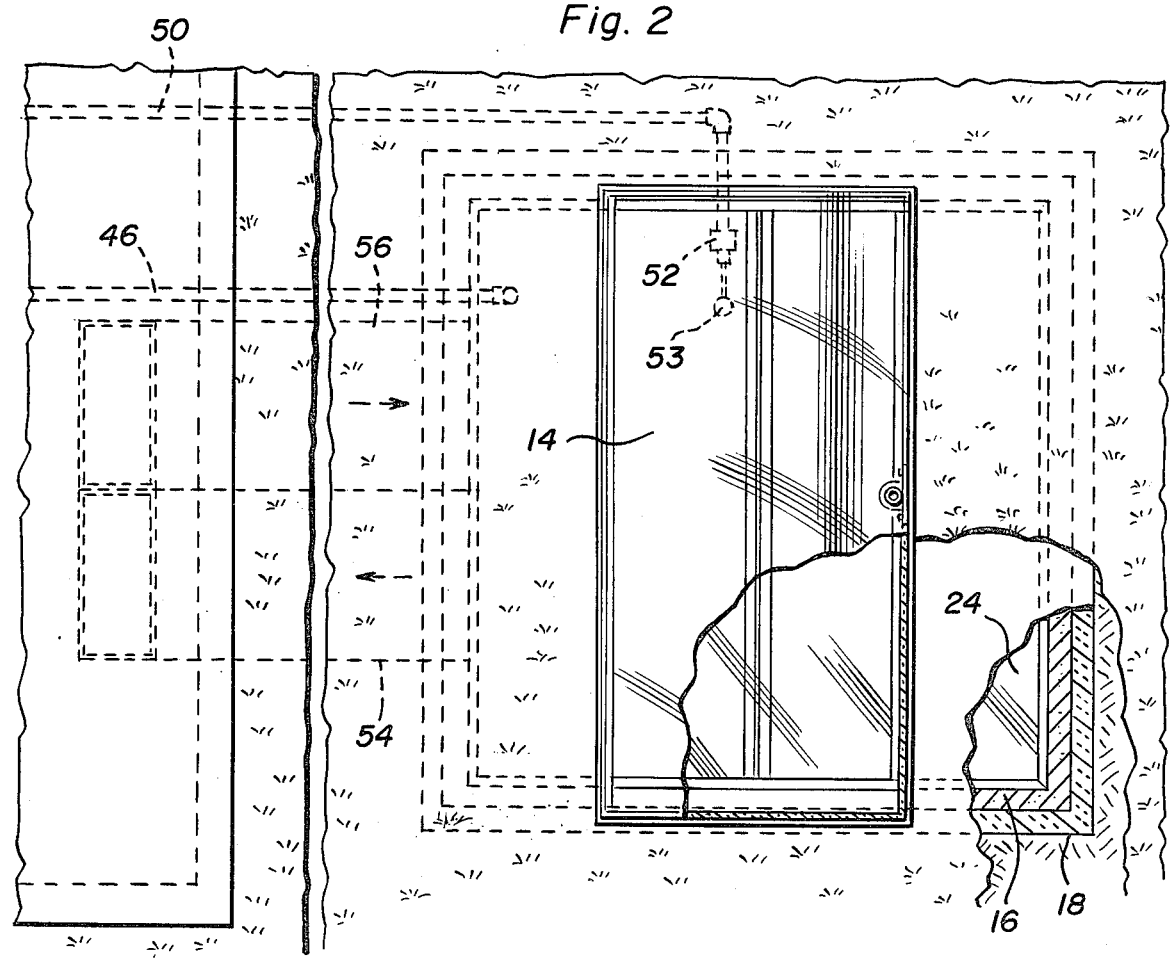
FIG. 2 is a top plan view of the solar heating system of the present invention in which a portion of the heat collecting and storage tank is broken away and shown in section.

Referring to FIGS. 2 and 3, solar heating system 12 includes magnifying glass 14 to concentrate and direct solar radiation to heat collecting and storage tank 16 which is placed below ground level and out of sight of landscaping 13. Tank 16 is preferably formed of concrete or fiber glass four inches thick and is surrounded by a thermal insulation layer 18 such as a foamed polystyrene insulation also about four inches thick. Storage tank 16 is divided into two compartments, air storage compartment 20 and water storage compartment 22. Compartments 20 and 22 are covered with glass baffles 24 and 26, respectively. Glass baffle 24 is supported by means of aluminum flange 28 placed about the full perimeter of storage tank 16. Glass baffle 26 formed in two sections 30 and 31 is supported by aluminum flange 32 placed along the perimeter of tank 16 and flange 34 a T-shaped flange placed across the center of tank 16. Each of the aluminum flanges is secured to the inner surface of storage tank 16 by means of an adhesive, bolts, or any suitable attaching means. As can be seen in FIG. 3, glass baffles 24 and 26 rest upon the perimeter shelf formed by aluminum flanges, 28 and 32, respectively, sections 30 and 31 also resting on the shelf formed by flange 34. Glass baffle 24 need not be a single glass sheet, but can be formed from a plurality of narrow glass sections. Likewise, glass baffle 26 can also be formed from a plurality of glass strips. Solar radiation impinged upon magnifying glass 14 is concentrated and directed through glass baffle 24 to air storage compartment 20 and through glass baffle 26 to water storage compartment 22.

Lens 14 is supported by aluminum flange 36 which supports the full perimeter of magnifying lens 14 and is secured to rectangular steel frame structure 38. Conduit vent 40 vents expanding air from water storage compartment 22 to the atmosphere. Vent 40 is secured to solar heat system 12 by means of a clamp 42 secured to steel support structure 38. A second perimeter aluminum flange 44 is attached to steel structure 38 for strength and is available for supporting a separate solar radiation concentrating lens, if desired.

Water stored in water storage portion 22 and heated by solar radiation directed by magnifying lens 14 is pumped into building 10 via waterline 46 such as a three-quarter inch copper tubing. Waterline 46 can be inserted through basement floor 48 or a crawl space at about ground level. Water heated in water storage portion 22 of solar heating system 12 is heated to a temperature sufficient for use in a manner associated with commercial or private residential buildings. Hot water which has been used is piped away as waste water. A standard pipe cut-off valve 52 and ball float 53 accurately control the water level in water storage portion 22 which is supplied via piping 50.

A heated air trunk line 54 communicates with air storage portion 20 and is connected to a conventional ducting system 56 in building 10. Trunk line 54 like water line 46 is directed through the basement floor 48 or a crawl space of building 10. Placed adjacent heated air trunk line 54 is return air duct 56 which returns air to air storage portion 20. The direction of arrows in ducts 54 and 56 indicates the movement of air to and from solar heating system 12. A blower (not shown) placed in the conventional ducting system in building 10 provides for the required air movement.

While the dimensions of solar heating system 12 may vary considerably depending upon use and location, the following dimensions can be used as a guide to provide solar heated air and water to a commercial building or private residence. Storage tank 16 comprising a four inch thick concrete or fiber glass shell has an outside dimension of eight foot square and an inside height of four feet. Surrounding shell 16 is four inches of insulation 18 such as "styrofoam" insulation. As can be seen in FIG. 3, insulation 18 is placed along the total perimeter of storage tank 16 and top and bottom thereof. The water level in water storage portion 22 is maintained at about twelve inches from the bottom of storage tank 16 which is equal to a storage capacity of about 1,000 gallons of water. Preferably six inches of space is left between the water level in water storage portion 22 and the bottom of glass baffle 26. Air storage portion 20 has a height of about two feet between glass baffles 24 and 26 providing a storage capacity of about 128 cubic feet of air. A space six inches above glass baffle 24 is left between the inside surface of storage tank 16 and glass baffle 24. Magnifying glass 14 has a width of about four feet placed at the center of storage tank 16 and a length of about eight feet across the top of storage tank 16. Magnifying glass 14 is spaced about one and one-half feet from the top of storage tank 16 by means of steel support structure 38. Aluminum flanges 28 and 32 comprise L-shaped members in which each leg of the flange including shelves 29 and 30 is one inch. Aluminum flanges 36 and 44 are similarly one inch by one inch long with respect to the length of each leg of the L-shaped flange. T-shaped flange 34 also includes one inch shelves 35 and 37. Magnifying glass 14 is preferably just above ground level as illustrated in FIG. 1. Glass baffles 24 and 26 can be single sheets of glass or be divided into two, three or even four portions to cover substantially the total area of air storage portion 20 and water storage portion 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solar heating system for supplying heated air and water for use in a building, said system comprising an enclosed storage tank positioned below ground level, a magnifying glass to direct and concentrate solar radiation to said storage tank positioned adjacent to and above ground level, said storage tank comprising an air storage portion fully below ground level and a water storage portion below said air storage portion, said air storage portion and said water storage portion comprising hollow regions formed by said storage tank and containing the respective fluids, said water storage portion comprising an inlet and an outlet communicating with the interior of said building for circulation and use of heated water in said building and said air storage portion comprising an inlet and outlet communicating with the interior of said building for circulation and use of heated air, said water storage portion being separated from said air storage portion by means of a transparent baffle, said magnifying glass being separated from said air storage portion by a transparent baffle, and said storage tank being covered substantially with a thermal insulating layer.

2. The system of claim 1 wherein said transparent baffles are made of glass.

3. The system of claim 2 wherein said baffles are positioned within said storage tank by means of aluminum flange supports which are secured to the inner surface of said tank and include a shelf member upon which said baffles are seated.

4. The system of claim 1 wherein said magnifying glass covers an area smaller than the area of the top of said storage tank.

5. The system of claim 1 wherein said water inlet includes a cut-off valve and means to operate said valve by sensing the level of water in said water storage portion.

6. The system of claim 1 wherein said water storage portion includes a conduit vent positioned within said water storage portion and communicating with the atmosphere above ground level.

7. The system of claim 1 wherein said storage tank is formed of concrete or fiber glass.

* * * * *